United States Patent [19]

Cur et al.

[11] Patent Number: 5,251,455
[45] Date of Patent: Oct. 12, 1993

[54] ENERGY EFFICIENT INSULATION SYSTEM FOR REFRIGERATOR/FREEZER

[75] Inventors: Nihat O. Cur, Royalton Township, Berrien County; Steven J. Kuehl, Lincoln Township, Berrien County, both of Mich.; Richard A. Sunshine, City of Granger, Ind.

[73] Assignee: Whirlpool Corporation, Benton Harbor, Mich.

[21] Appl. No.: 931,097

[22] Filed: Aug. 14, 1992

[51] Int. Cl.$^5$ ............................................. F25B 39/02
[52] U.S. Cl. ........................................ 62/199; 62/430; 62/DIG. 13
[58] Field of Search .......... 62/199, 200, 430, DIG. 13

[56] References Cited

U.S. PATENT DOCUMENTS

| | | | |
|---|---|---|---|
| 2,496,220 | 1/1950 | Kleist | 62/430 |
| 2,552,345 | 5/1951 | Philipp | 62/DIG. 13 |
| 2,576,663 | 11/1951 | Atchison | 62/199 |
| 2,595,874 | 5/1952 | Nason | 62/DIG. 13 |
| 2,641,109 | 6/1953 | Muffly | 62/199 |
| 2,739,456 | 3/1956 | Saunders | 62/DIG. 13 |
| 2,768,046 | 10/1956 | Evans | 52/404 |
| 4,439,998 | 4/1984 | Horvay et al. | 62/200 X |
| 5,082,335 | 1/1992 | Cur et al. | 62/DIG. 13 |

Primary Examiner—Harry B. Tanner
Attorney, Agent, or Firm—Stephen D. Krefman; Thomas J. Roth; Thomas E. Turcotte

[57] ABSTRACT

A refrigeration appliance having at least two refrigeration compartments, each compartment having its own access door, is provided wherein there is a first evaporator for the first compartment the first evaporator operating at a first pressure level and a second evaporator for the second compartment, the second evaporator operating at a pressure level higher than the first pressure level. There is a control device for directing refrigerant to a selected one of the evaporators from a condenser and for preventing a flow of refrigerant into the first evaporator when refrigerant is being directed into the second evaporator to cool the second compartment. Around the first compartment is placed insulation having a higher thermal resistance than that placed around the second compartment since the first compartment is kept at a lower temperature that the second compartment. A phase change material may be used in association with one or both of the evaporators.

20 Claims, 6 Drawing Sheets

ENERGY EFFICIENT INSULATION SYSTEM FOR REFRIGERATOR/FREEZER

BACKGROUND OF THE INVENTION

The present invention relates to refrigeration appliances and more particularly to an insulation system for refrigeration appliances.

In typical domestic refrigeration appliances, the appliance oftentimes has two separate compartments which are maintained at different temperatures. For example, there may be a freezer compartment which has a temperature maintained below 0° C. and a fresh food compartment which is maintained at a temperature somewhat above 0° C.

In many commercially available refrigeration devices a single evaporator is used with an evaporating pressure of approximately 0–2 psig. Air is circulated over the evaporator from both the freezer compartment and the refrigerator compartment. This "mixed" air flow scheme results in dehumidification of the refrigerator compartment and subsequent frost build-up on the single evaporator coil, necessitating a periodic defrost cycle to get rid of the accumulated frost.

Also, using a single evaporator to provide the cooling for two compartments which are maintained at different temperatures results in an inefficient use of the refrigeration system for the higher temperature compartment.

It is known in the art to utilize multiple evaporators in refrigeration appliances. U.S. Pat. No. 2,576,663 discloses the use of two evaporators, each for its own refrigeration compartment. The evaporators are alternately supplied with refrigerant through a control valve.

U.S Pat. No. 3,390,540 discloses the use of multiple evaporators in a refrigeration system. Each evaporator is controlled by an expansion valve and it is possible to operate more than one evaporator at a time.

U.S. Pat. No. 3,108,453 discloses a multiple evaporator refrigeration system in which the evaporators may be used independently of each other. Also a phase change material is used in connection with at least one of the evaporators.

U.S. Pat. No. 3,786,648 discloses the use of multiple evaporators for controlling the temperature in multiple compartments with the evaporators operating independently of each other.

U.S. Pat. No. 4,439,998 discloses a refrigeration apparatus having multiple evaporators with an electronically controlled valve system to deliver refrigerant to one evaporator in preference to the other, but causing the valve system to deliver refrigerant to the other evaporator after a predetermined amount of time.

U.S. Pat. No. 4,916,916 discloses the use of a phase change energy storage material in connection with a multiple evaporator refrigeration system.

It is also known in the art to provide various different insulation systems around the different refrigerator compartments, and to use vacuum insulation panels as a part of the insulation systems. U.S. Pat. No. 2,595,874 discloses the use of a moisture impervious insulation material (foamed polystyrene) to surround the freezer compartment and the use of glass wool as the remaining insulation material. One or two evaporators may be used in that refrigerator.

U.S. Pat. No. 2,633,003 discloses the use of a more efficient insulation layer to be used around the freezer compartment in a double compartment refrigeration device. Two separate evaporators are used which may be operated in series, or the freezer evaporator may be used individually.

U.S. Pat. No. 2,739,456 discloses the use of bagged insulation around the freezer compartment and unbagged insulation around the bagged insulation and in the rest of the refrigeration device. Separate evaporators are used for the freezer and fresh food compartments.

U.S. Pat. No. 2,768,046 disclose the use of vacuum insulation panels positioned around a portion of the freezer compartment to provide enhanced insulation around that compartment.

SUMMARY OF THE INVENTION

The present invention provides a refrigeration appliance with multiple evaporators in which the evaporator circuits operate sequentially. In the preferred embodiments disclosed there are two evaporator circuits, one operating a freezer compartment and the other operating a fresh food compartment. The freezer compartment runs typically at 0–2 psig evaporation pressure until satisfied. The refrigerator section then runs typically at 18–22 psig evaporation pressure, at which pressure level, significant energy reductions are achieved.

A single compressor supplies the refrigerant through the condenser which serves to feed either the high or low pressure evaporators through known expansion devices such as capillary tubes, orifices, expansion valves, etc. Although various circuit options are disclosed, each employ some type of solenoid valve at the capillary tube inlet to determine which evaporator is fed.

Although the use of vacuum insulation panels in an insulation system is known, current vacuum insulation panels are quite costly and the use of such panels throughout the entire refrigeration cabinet do not provide sufficient energy savings to offset the increased cost of such panels.

In a conventional top-mount refrigerator (a top mount freezer compartment and a lower fresh food compartment), roughly 50% of the total energy usage goes to cool the freezer compartment and the other 50% goes to cool the fresh food compartment. However, this balance shifts to approximately 33% for the fresh food compartment and 67% for the freezer compartment when a dual, sequentially operated evaporator system is used. With such an energy balance, in now becomes economical to use vacuum insulation panels around the freezer compartment only. This permits a realization of approximately 67% of the energy savings by using the vacuum panels, yet covering only 35% (approximately) of the area covered by insulation with the vacuum insulation panels.

With the freezer compartment insulated with vacuum insulation panels, energy loss is reduced, thus permitting the use of a smaller compressor. However, current compressor technology is such that compressor efficiency lowers as compressor size decreases. Therefore, to maintain high efficiency for the compressor, a larger compressor than necessary is used. In order to maintain higher suction pressures with the larger capacity compressor than necessary, a phase change material can be used in conjunction with the freezer evaporator.

The use of phase change material would have the following effects:

1. Raise the evaporating-suction pressure above normal levels (which would increase capacity slightly);
2. Act as a "thermal sponge" to absorb the excess cooling capacity (due to the use of the larger more efficient capacitor);
3. Flatten the exponential temperature decay profile during the off-cycle (due to the single temperature phase change material process or gliding temperature for a non-eutectic phase change material).

During the off-cycle the phase change material potential could be used through either passive means or through a "freezer fan only" freezer cooling mode.

A phase change material may also be utilized with the fresh food compartment evaporator since that evaporator operates at a higher pressure providing excess cooling capacity even with a down-sized compressor.

DETAILED DESCRIPTION OF THE PREFERRED EMBODIMENTS

Figure 1:
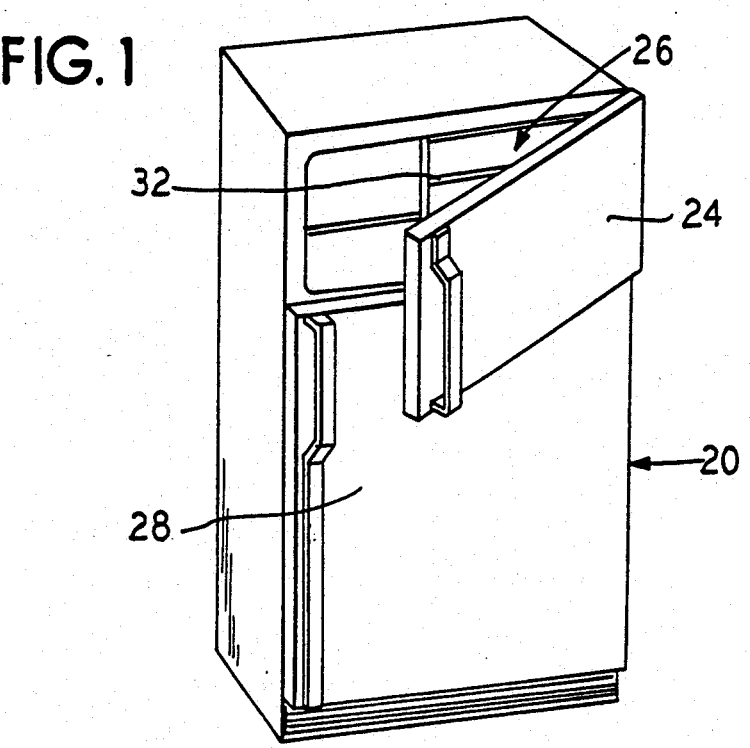
FIG. 1 is a perspective view of a refrigeration appliance embodying the principles of the present invention.
Figure 2:
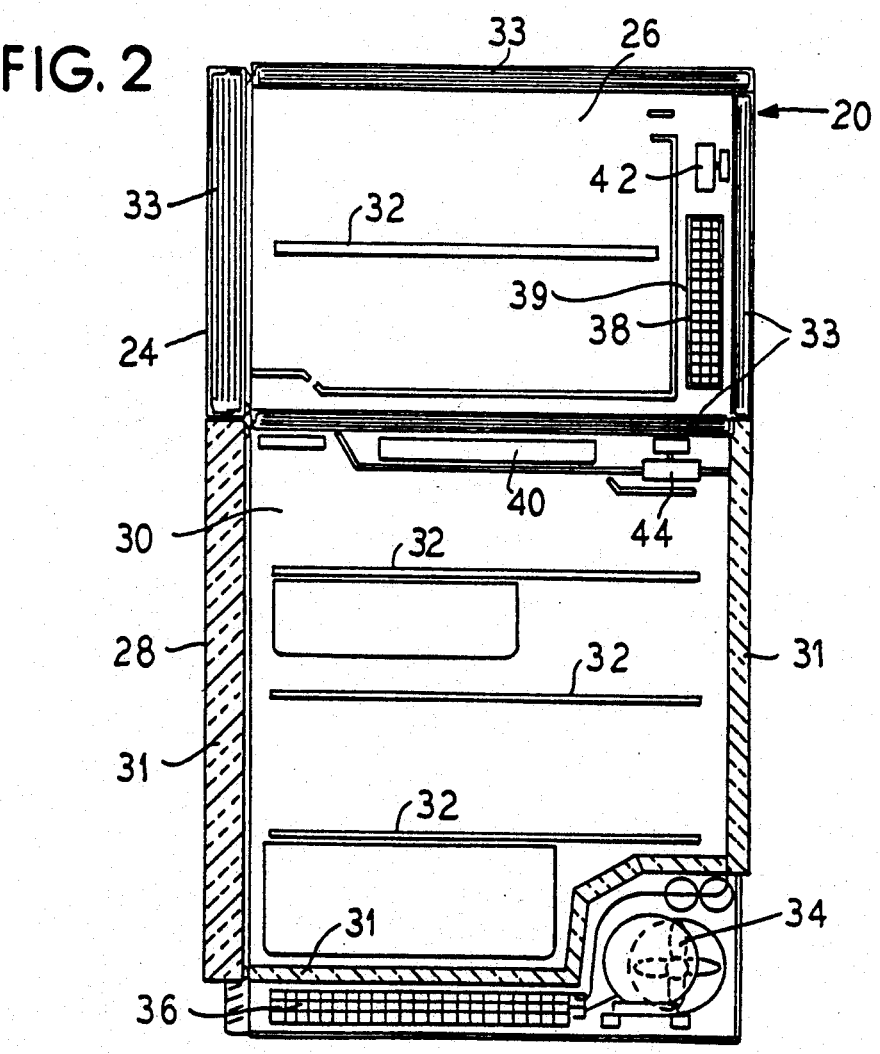
FIG. 2 is a side sectional view of the appliance of FIG. 1.

In FIGS. 1 and 2 there is shown generally a refrigeration appliance at 20 which comprises a exterior cabinet 22 having a first openable door 24 to expose a first interior compartment 26 and a second openable door 28 to expose a second interior compartment 30. Within each of the compartments 26, 30 there may be one or more shelves 32 for receiving food articles. Generally compartment 26 will be maintained at a temperature sufficiently below 0° C. to assure that all of the articles contained within that compartment will be maintained in a frozen state. Compartment 30 generally is maintained somewhat above 0° C. to maintain the items placed therein in a chilled, but not frozen condition.

Positioned within each of the walls of the cabinet is an insulating material 31 to allow the temperatures within the compartments to be maintained below ambient temperature. Positioned around the freezer compartment 26, preferably on all five external sides and possibly one in the mullion separator, are insulation panels 33, such as vacuum insulation panels of the types disclosed in U.S. Pat. Nos. 5,082,335 and 5,018,328 and pending patent application Ser. No. 815,709 entitled "THERMOFORMED VACUUM INSULATION CONTAINER", incorporated herein by reference.

In order to maintain the compartments at the desired temperature levels, a refrigeration device is provided which comprises a compressor 34, a condenser 36, an evaporator 38 for the first compartment 26 and a second evaporator 40 for the second compartment 30 as deemed necessary. Appropriate air moving devices 42, 44 are provided for circulating air within each of the compartments past its respective evaporator to maintain a fairly consistent temperature throughout each compartment. In some configurations natural convection could be used to provide circulating air for the evaporator in lieu of the air moving devices. The actual refrigeration circuits are illustrated in greater detail in FIGS. 3 and 6 through 11

Figure 3:
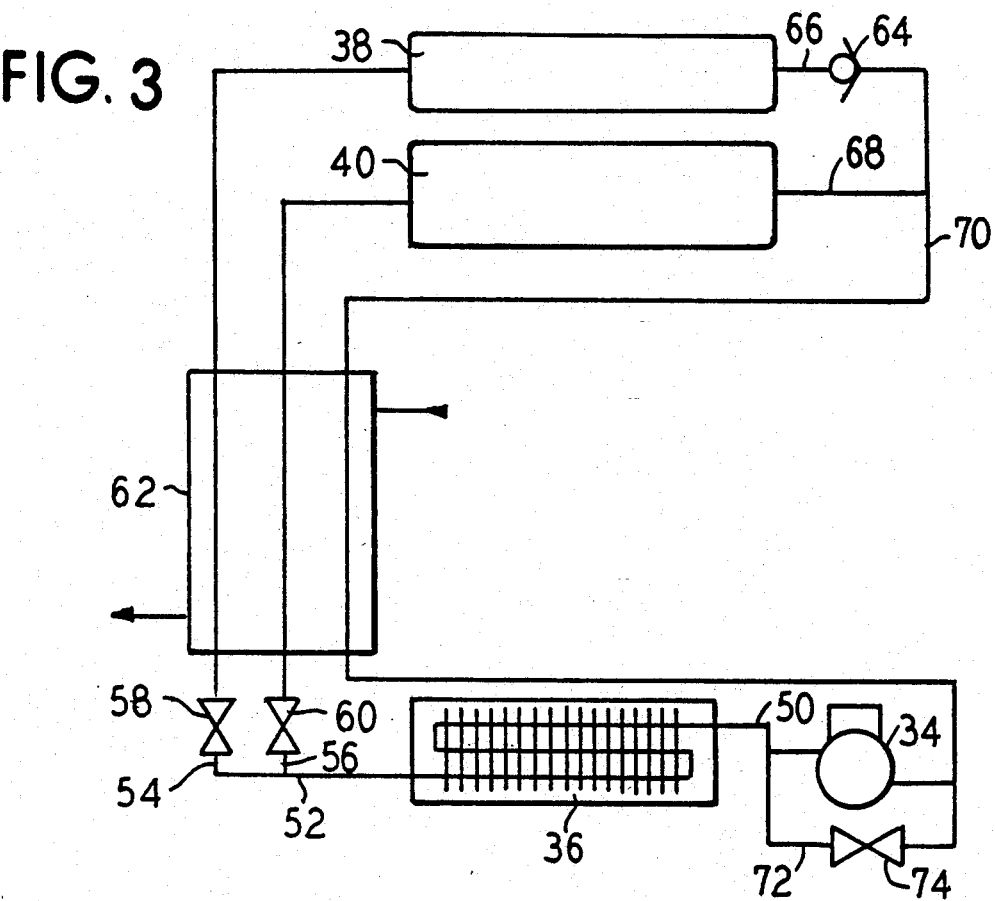
FIG. 3 is a first embodiment of a refrigeration circuit diagram.

In FIG. 3 a first embodiment of a refrigeration circuit is illustrated. In this embodiment the single compressor 34 supplies refrigerant through line 50 to the single condenser 36. Refrigerant then flows out of condenser on line 52 and is presented to parallel lines 54, 56 each of which are supplied with an individual latching type solenoid valve 58, 60. The solenoid valves 58 and 60 should preferably be the latching type which requires power for a brief moment (a fraction of a second) to change position from open to closed or vice versa. If the latching type valves are not used, then the valve 58 should be a normally closed type and the valve 60 should also preferably be a normally closed type but the normally open type can be used too. Lines 54 and 56 pass through a heat exchanger 62 towards evaporators 38 and 40 respectively. A check valve 64 is provided on suction line 66 which exits from evaporator 38. Suction line 68 which exits from evaporator 40 has no such valve. Lines 66 and 68 join in a return suction line 70 which also passes through the heat exchanger 62 on its return to the compressor 34.

Figure 4:
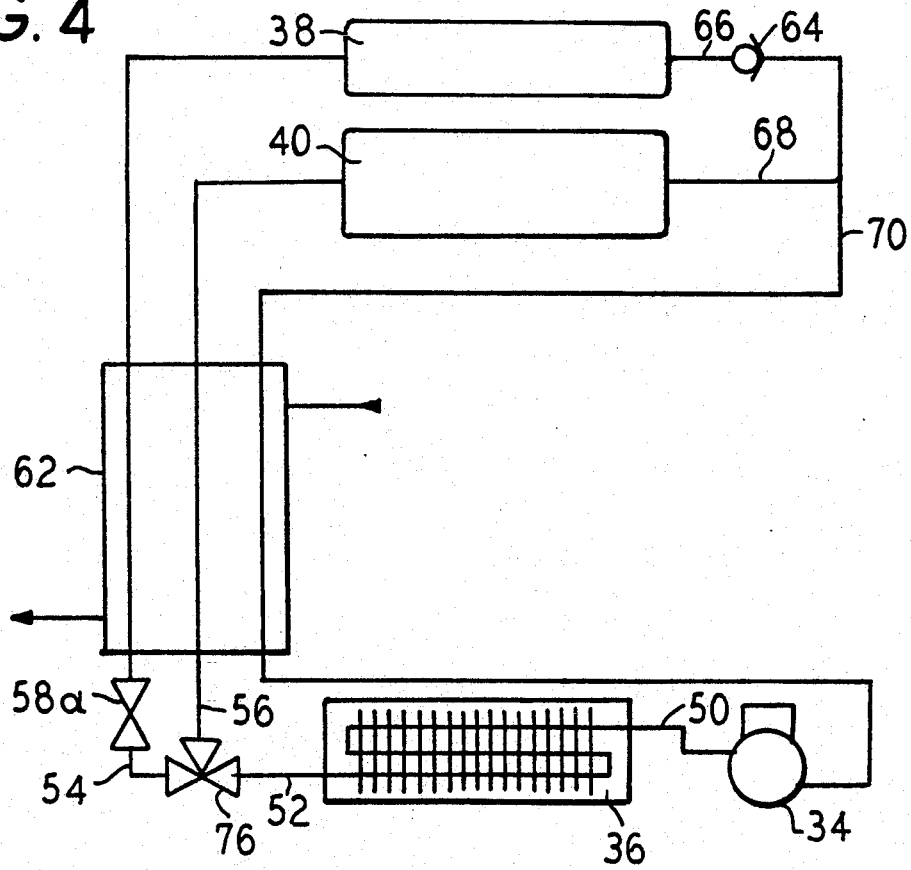
FIG. 4 is the representation of the refrigeration cycle on a pressure-enthalpy diagram.

FIG. 4 is the representation of the sequentially-operated two evaporator refrigeration system on a pressure-enthalpy diagram. As shown in FIG. 4, FC mode indicates the freezer mode of operation and the evaporation occurs at a lower suction pressure similar to the conventional refrigeration system. RC mode indicates the fresh food compartment cooling and the evaporation occurs at a higher suction pressure.

Figure 5:
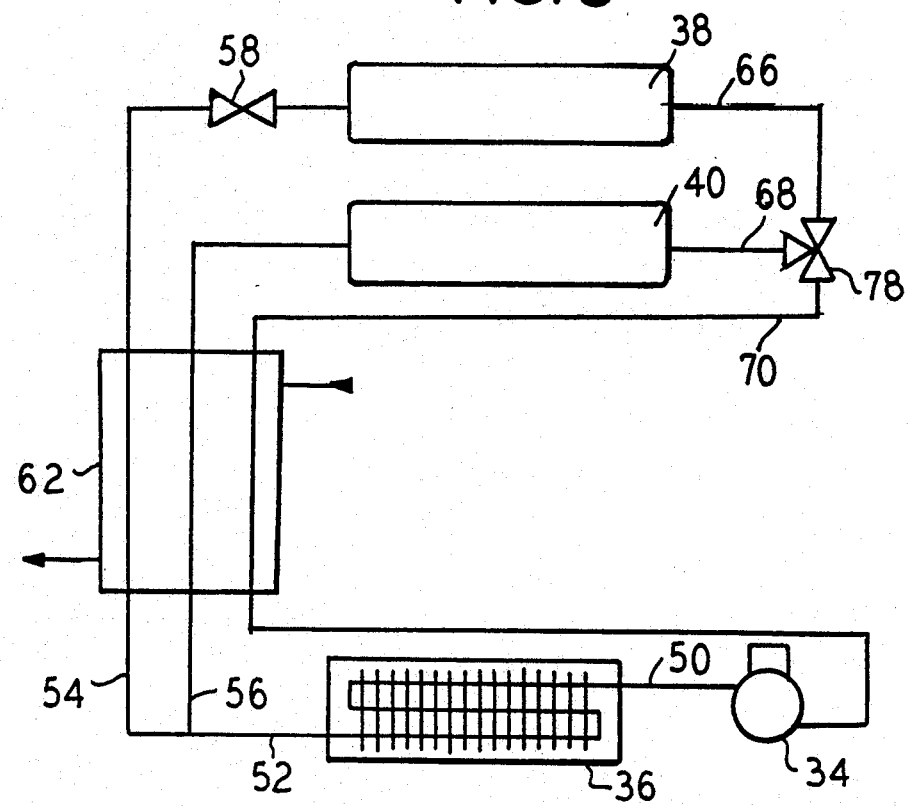
FIG. 5 is a typical representation of the compressor power usage against time with a sequentially-operated dual evaporator refrigerator.
Figure 6:
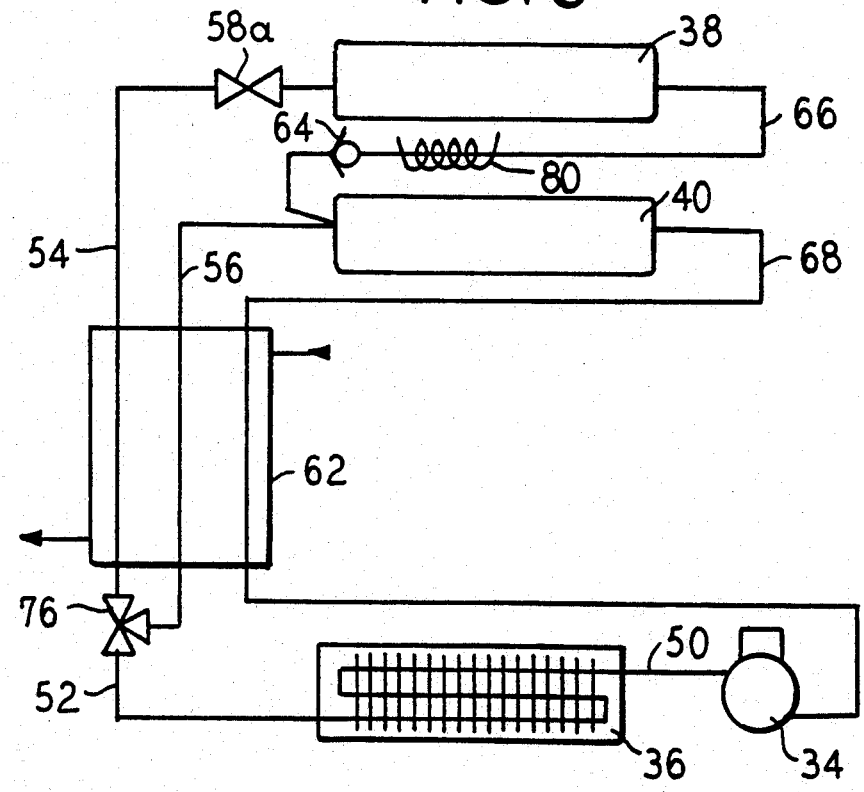
FIG. 6 is a second embodiment of a refrigeration circuit diagram.
Figure 7:
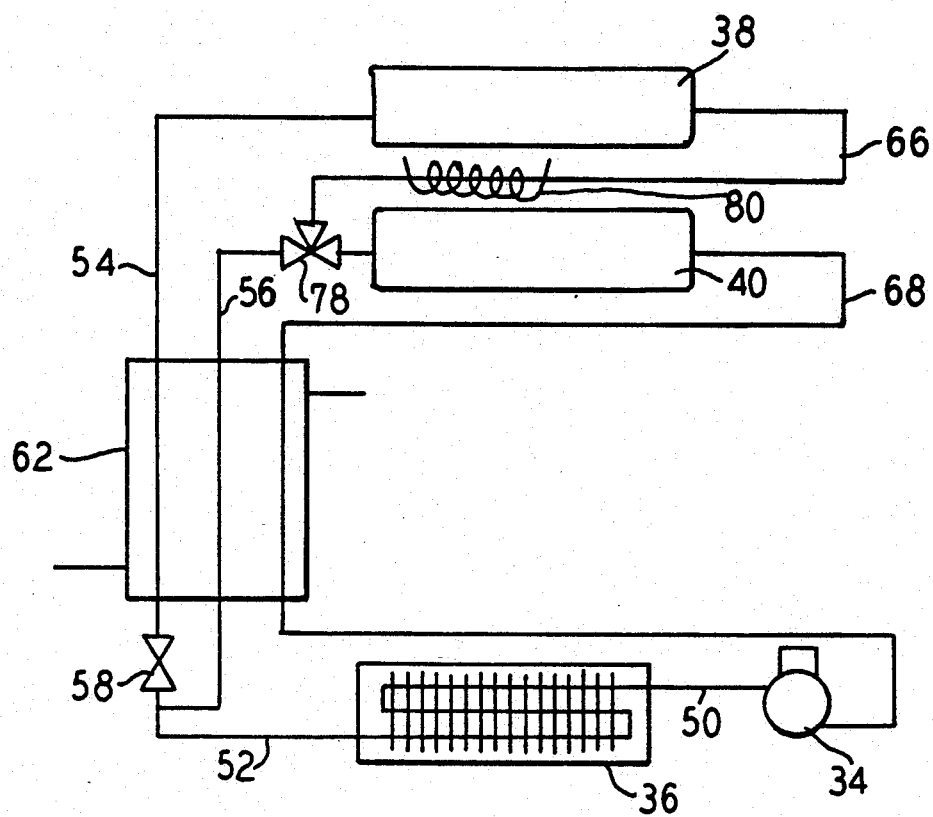
FIG. 7 is a third embodiment of a refrigeration circuit diagram.

FIG. 5 is the typical compressor power data (y-axis) vs time (x-axis graph). As shown in FIG. 5, the fresh food cooling mode has the higher compressor power peaks and the freezer compressor operation has the lower compressor power peaks and no power consumption (off-cycle) in between the on-cycle modes of operation. As is apparent from the actual power data, at times the fresh food cooling mode and the freezer cooling mode follow each other in a sequential manner with no off-cycle in between and at other times they are separated with an off-cycle in between.

A second embodiment (FIG. 6) of the refrigeration cycle contains many of the same components which are identified with the same reference numerals as used in FIG. 3. The primary difference between the embodiment of FIG. 6 and that of FIG. 3 is that a bypass line 72 is provided around the compressor 34 which allows pressure equalization across the compressor through a solenoid valve 74 prior to its start-up.

Again, a third embodiment (FIG. 7) of the refrigeration cycle contains many of the same components which are identified with the same reference numerals as used in FIG. 3. The primary difference between the embodiment of FIG. 7 and that of FIG. 3 is that a three-position latching valve 76 is utilized at the junction of lines 52 and 56 which allows refrigerant to flow either through line 56 or line 54, but not both. The third position of the valve 76 is to close both lines 56 and 54.

Applicants have determined that it presently appears that the embodiment illustrated in FIG. 3 has the highest potential for energy reduction during operation. Therefore, the various modes of operation of the two evaporators will be described with respect to that embodiment.

In this embodiment evaporator 38 is utilized in the refrigerator compartment 26 which is maintained at a below freezing temperature and thus the evaporator is operated at a lower pressure, generally in the range of 0-2 psig.

Evaporator 40 is utilized in the fresh food compartment and is normally maintained above freezing temperature and is operated at a higher pressure, generally in the range of 18-22 psig. Since evaporator 40 operates at a higher pressure than evaporator 38, a lower capacity compressor could be used in such a system than is used in typical serial run multi-evaporator systems. Also, the use of vacuum insulation panels around the freezer compartment 26 reduce the compressor capacity requirements. However, current compressor technology results in a degradation of efficiency of the compressor in smaller sizes. This degradation is due to the mechanical and manufacturing limitations of smaller mechanisms. Therefore, Applicants have found that the use of an oversized compressor 34 can be used in the disclosed embodiments with the excess capacity used to store thermal energy in a phase change material 39 associated with evaporators 38 and 40 such that the material will change phase either from a gas to a liquid or from a liquid to a solid during operation of the evaporators 38, 40. This permits the compressor to be run less frequently, relying on the phase change material to absorb heat energy during periods when the refrigerant is not being supplied through evaporators 38, 40.

With respect to the modes of operation of the refrigeration circuit of FIG. 3, FIGS. 8-11 illustrate the various operation modes.

Figure 8:
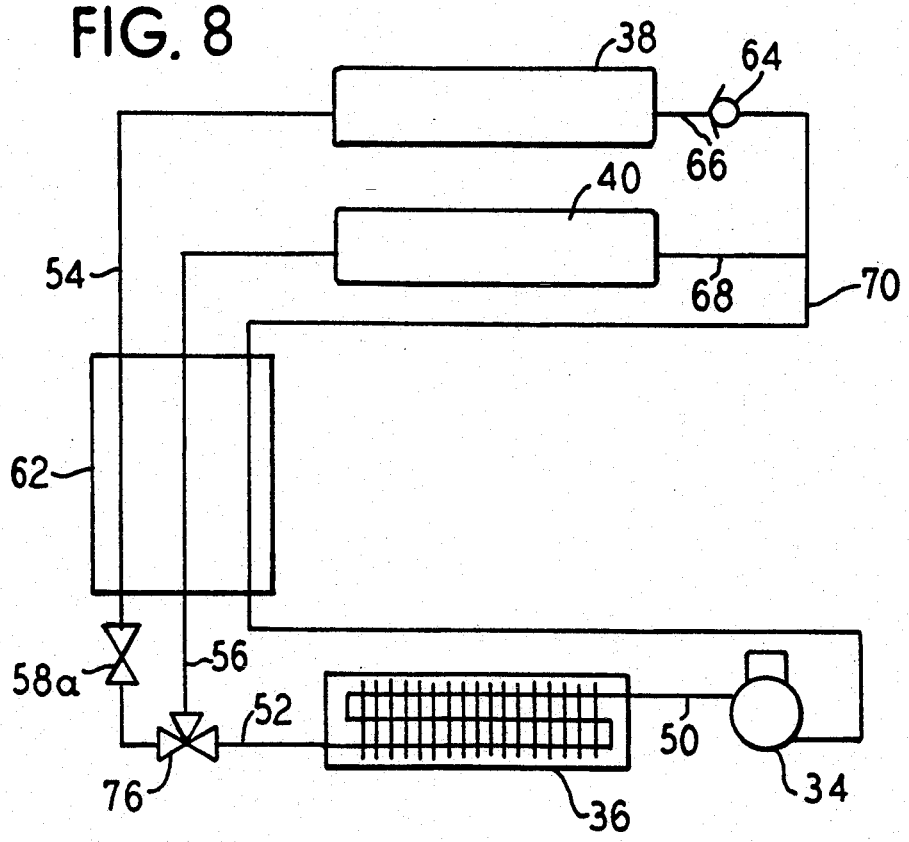
FIG. 8 is the first embodiment of the refrigeration circuit diagram shown in an off-cycle mode.

In FIG. 8 the off-cycle mode is illustrated. In that mode of operation, latching solenoid valve 60, joining lines 56 and 52, and latching solenoid valve 58, joining lines 54 and 52, are both closed for the major portion of the off-cycle. Check valve 64 on line 66 is also closed during the off-cycle mode and there is basically no refrigerant (some refrigerant vapor might be present) in lines 54, 56, 66 and 68 or in evaporators 38 and 40. The refrigerant therefore is present throughout a circuit which includes the compressor 34, line 50, condenser 36 and line 52. At the end of an off-cycle (when either compartment calls for cooling), the latching solenoid valve 60 is energized briefly to open, thus permitting refrigerant migration and pressure equalization through the fresh food circuit while the compressor 34 is still in an off condition (typically a 3 minute equalization time is required).

Figure 9:
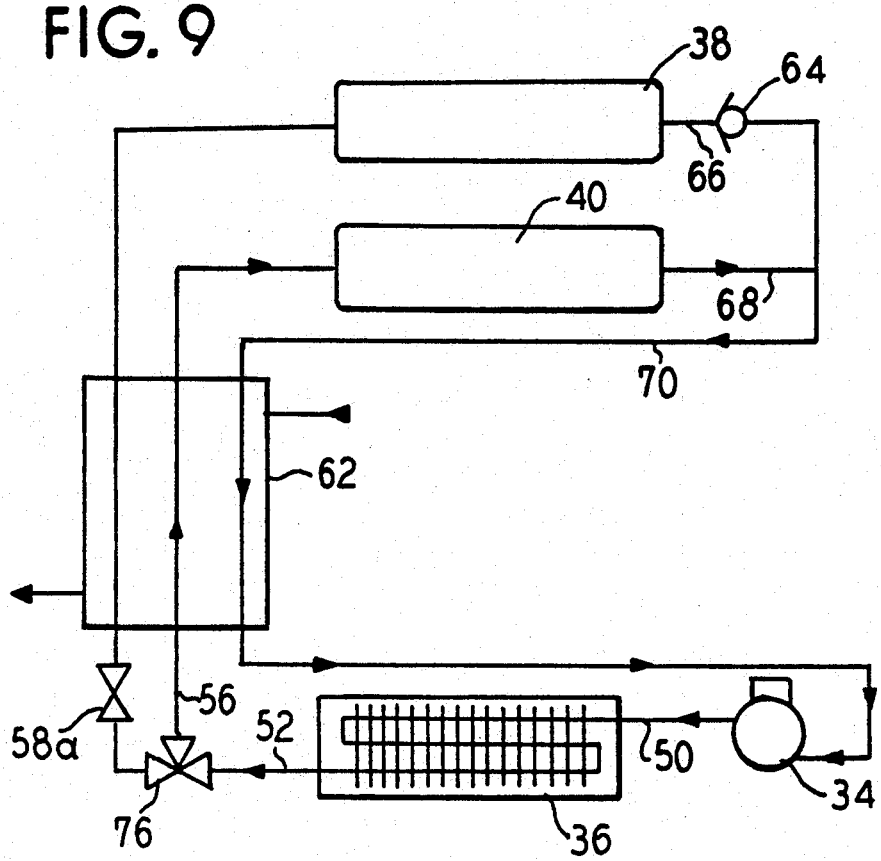
FIG. 9 is the first embodiment of the refrigeration circuit diagram shown in a fresh food cooling mode.

FIG. 9 illustrates operation of the system in a fresh food cooling mode. The pressure equalization (not needed if this cycle comes just after the freezer mode of operation) and the subsequent fresh food cooling mode are initiated and the fresh food cooling mode is terminated in response to an appropriate control signal representing a temperature condition of the fresh food compartment 30, time dependent signal or other control. In this mode, the latching solenoid valve 60 is now open (just after the pressure equalization) and remains non-energized and thus in the same condition as described at the end of an off-cycle. If this mode follows the freezer cooling mode, then the latching solenoid valve 5 is briefly energized to close and the latching solenoid valve 60 is briefly energized to open. Also, check valve 64 is normally closed and the latching solenoid valve 58 is closed (same as in the off-cycle mode shown in FIG. 8). The major difference in FIG. 9 is that the compressor 34 is on and thus refrigerant is being pumped through the circuit in the direction of the arrows. Thus, refrigerant flowing from the condenser 36 flows through lines 52 and 56 through the heat exchanger 62 and into evaporator 40 where heat is absorbed from the air circulating over the evaporator 40 in refrigerator compartment 30 as well as absorbed from the phase change material (if used) associated with evaporator 40. The refrigerant then flows through suction lines 68 and 70, back through the heat exchanger 62 to return to the compressor 34.

Figure 10:
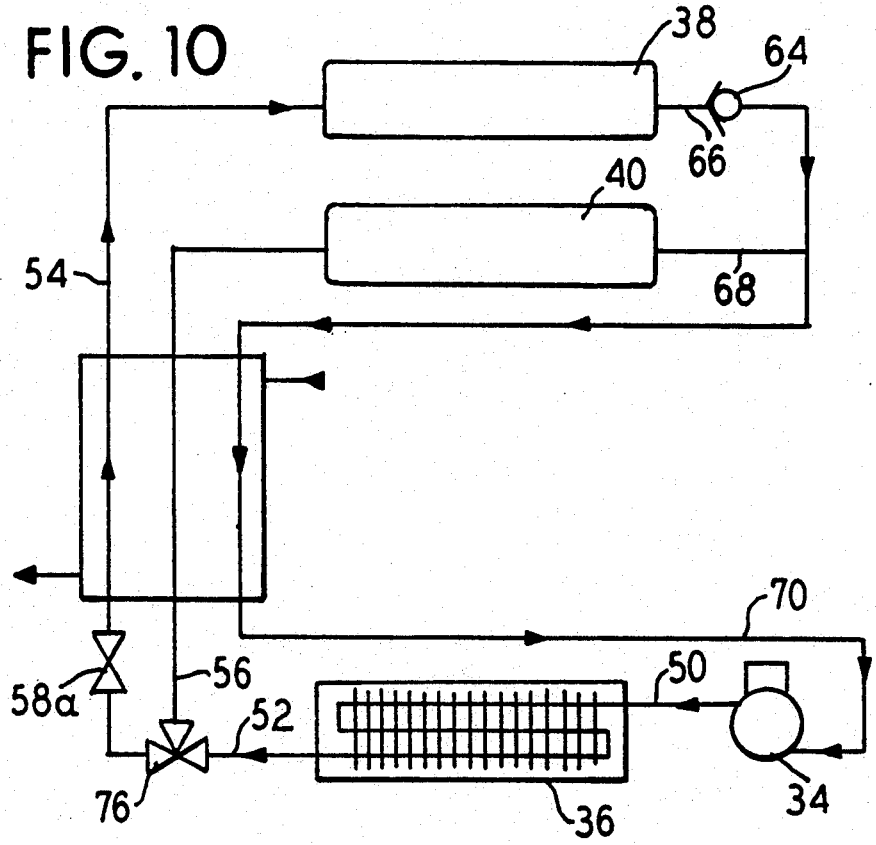
FIG. 10 is the first embodiment of the refrigeration circuit diagram shown in a freezer cooling mode.

FIG. 10 illustrates the operation of the circuit with the evaporator 38 in operation, that is, the freezer cooling mode. This mode is also initiated and terminated in response to an appropriate control signal representing a temperature condition of the freezer compartment 26, a time dependent signal or other control signal. If freezer cooling mode is initiated after an off-cycle, the latching solenoid valve 60 is open during the pressure equalization period to allow pressure equalization over the fresh food compartment cooling circuit. Once the pressure equalization is complete or if the freezer cooling mode starts after a fresh food cooling cycle, the latching solenoid valve 60 is briefly energized to close and the latching solenoid valve 58 is briefly energized to open (to start the freezer cooling) so that line 52 is opened to line 54 and closed to line 56. Check valve 64 will be open due to a flow of refrigerant into it from evaporator 38.

In this mode of operation, the compressor is required to provide a much lower pressure on suction line 70. In this mode refrigerant is supplied from the compressor 34 through line 50, condenser 36, line 52, and line 54 to the evaporator 38 and then out line 66 through valve 64 to line 70 to return to the compressor. Any refrigerant remaining in line 56 and evaporator 40 will be at a higher pressure and thus there will not be any migration of refrigerant from line 66 into line 68 and evaporator 40. With valve 60 closing the connection between line 52 and line 56, line 68 will represents a high pressure dead end line, thus blocking any flow of refrigerant into line 68 from line 66.

Figure 11:
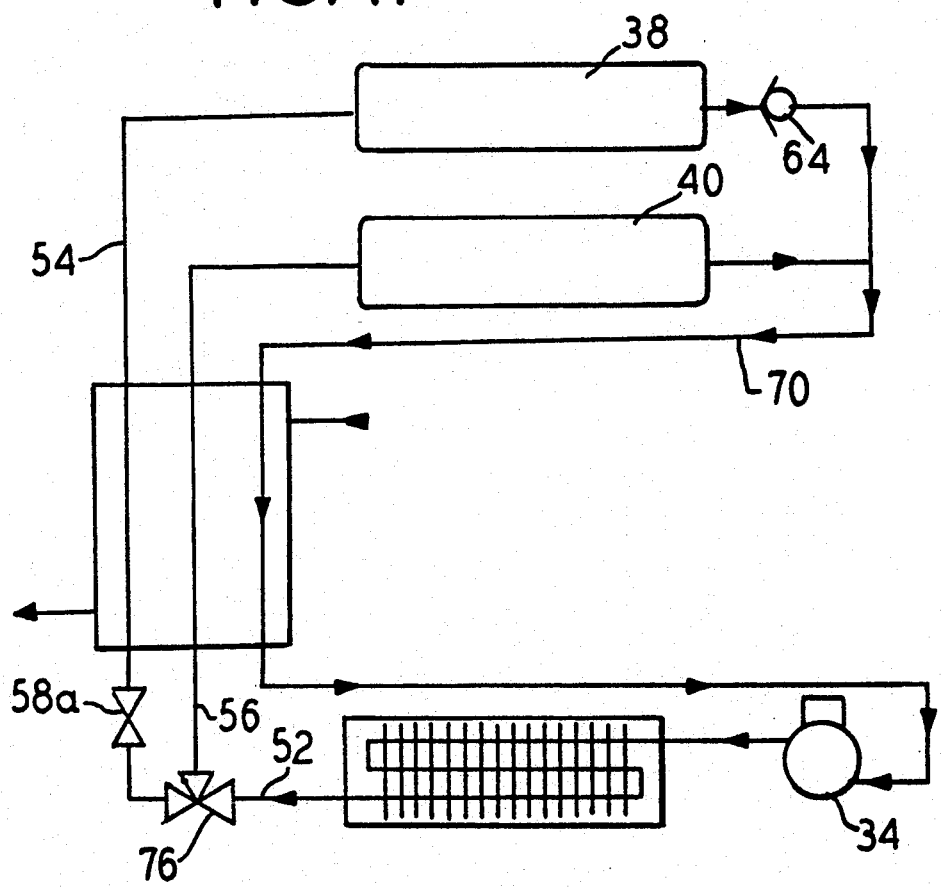
FIG. 11 is the first embodiment of the refrigeration circuit diagram shown in a freezer evaporator pump-out mode.

FIG. 11 discloses a pump-out mode during which time refrigerant is pumped out of the evaporator 38 at the end of the freezer cooling mode. In this mode of operation the latching solenoid valve 60 remains closed thus keeping a closed path between line 52 and line 56 leading to high pressure evaporator 40. The latching solenoid valve 58, however, is also briefly energized or electrically pulsed and thus moved to a closed position thus preventing flow of refrigerant from line 52 to line 54. Check valve 64 is opened due to the low pressure in line 70.

In this mode of operation the compressor 34 runs to provide the low pressure suction on line 70. This low pressure suction causes refrigerant to be evacuated both from evaporator 38 and evaporator 40. This step is undertaken to assure that sufficient refrigerant will be available of efficient operation of evaporator 40 in the mode shown in FIG. 9. Since the refrigeration circuit only has sufficient refrigerant for the evaporator 38 circuit or the evaporator 40 circuit alone, the refrigerant charge distribution is critical and it is absolutely necessary that the refrigerant does not get trapped in evaporator 38 during the fresh food mode operation, thus requiring the pump-out mode illustrated in FIG. 11 at the end of the freezer cooling mode illustrated in FIG. 10.

Following completion of the pump out mode of FIG. 11, which can occur for a predetermined time period or in response to a sensed condition, the compressor 34 is first turned off, the valves 58 and 60 remain closed if an off-cycle mode of operation is to follow. With the compressor 34 turned off and the valves 58 and 60 closed, check valve 64 will close due to low pressure in evaporator 38 and relatively higher pressure in line 70, thus resulting in the condition shown in FIG. 8 as the off-cycle mode. At the end of the off-cycle, mode refrigerant will be allowed to migrate through line 56 and evaporator 40 to equalize pressure across the compressor thereby permitting an easier start condition for the compressor. If a fresh food mode operation is to follow the pump-out mode, then the compressor 34 will remain on, the valve 58 will close and the valve 60 will open at the end of the pump-out mode.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. A refrigeration appliance comprising:
   an external cabinet;
   an interior liner, spaced inwardly of said external cabinet to form at least two refrigeration compartments, each compartment having its own access door;
   vacuum insulation panels being positioned in a space between said cabinet and said liner adjacent to said first compartment;
   a first evaporator for said first compartment, said first evaporator operating at a first pressure level;
   a second evaporator for said second compartment, said second evaporator operating at a pressure level higher than said first pressure level; and
   control means operative to sequentially operate said evaporators, such that only one evaporator provides cooling at any given time.

2. A refrigeration appliance according to claim 1, wherein said vacuum insulation panels surround all external sides of said first compartment.

3. A refrigeration appliance according to claim 2, wherein said vacuum insulation panels are also adjacent to said second compartment only where said first and second compartments have a common wall.

4. A refrigeration appliance according to claim 1, wherein a phase change material is provided in association with said first evaporator.

5. A refrigeration appliance according to claim 1, wherein said first compartment is maintained at a temperature below 0 degrees centigrade.

6. A refrigeration appliance according to claim 1, wherein said second compartment is maintained at a temperature above 0 degrees centigrade.

7. A refrigeration appliance according to claim 1, wherein a phase change material is provided in association with said second evaporator.

8. A refrigeration appliance according to claim 1, wherein a phase change material is provided in association with said first and second evaporators.

9. A refrigeration appliance comprising:
   an external cabinet;
   an interior liner, spaced inwardly of said external cabinet to form at least two cubical refrigeration compartments, each compartment having its own access door through said external cabinet;
   vacuum insulation panels being positioned in a space between said cabinet and said liner to surround said first compartment on all five external sides thereof;
   a first evaporator for said first compartment, said first evaporator operating at a first pressure level;
   a second evaporator for said second compartment, said second evaporator operating at a pressure level higher than said first pressure level; and
   control means operative to sequentially operate said evaporators, such that only one evaporator provides cooling at any given time.

10. A refrigeration appliance according to claim 9, wherein said vacuum insulation panels are also adjacent to said second compartment only where said first and second compartments have a common wall.

11. A refrigeration appliance according to claim 9, wherein a phase change material is provided in association with said first evaporator.

12. A refrigeration appliance according to claim 9, wherein said first compartment is maintained at a temperature below 0 degrees centigrade.

13. A refrigeration appliance according to claim 9, wherein said second compartment is maintained at a temperature above 0 degrees centigrade.

14. A refrigeration appliance according to claim 9, wherein a phase change material is provided in association with said second evaporator.

15. A refrigeration appliance according to claim 9, wherein a phase change material is provided in association with said first and second evaporators.

16. A refrigeration appliance comprising:
   an external cabinet;
   an interior liner, spaced inwardly of said external cabinet to form at least two refrigeration compartments, each compartment having its own access door;
   thermal insulation being positioned in a space between said cabinet and said liner surrounding said compartments; said insulation surrounding said first compartment having a first level of thermal resistance and said insulation surrounding said second compartment having a second, lower level of thermal resistance;
   a first evaporator for said first compartment, said first evaporator operating at a first pressure level;
   a second evaporator operating at a pressure level higher than said first pressure level; and
   control means operative to sequentially operate said evaporators, such that only one evaporator provides cooling at any given time.

17. A refrigeration appliance according to claim 16, wherein said insulation surrounding said first compartment comprise vacuum insulation panels.

18. A refrigeration appliance according to claim 17, wherein said vacuum insulation panels are adjacent to said second compartment only where said first and second compartments have a common wall.

19. A refrigeration appliance according to claim 17, wherein a phase change material is provided in association with said first evaporator.

20. A refrigeration appliance according to claim 17, wherein a phase change material is provided in association with said second evaporator.

* * * * *